(12) United States Patent
Lee

(10) Patent No.: US 7,075,029 B2
(45) Date of Patent: Jul. 11, 2006

(54) METHOD FOR ASSEMBLING A VEHICLE BODY

(75) Inventor: Gi Ho Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/023,701

(22) Filed: Dec. 27, 2004

(65) Prior Publication Data

US 2005/0274699 A1    Dec. 15, 2005

(30) Foreign Application Priority Data

Jun. 9, 2004    (KR) ...................... 10-2004-0042287

(51) Int. Cl.
*B23K 11/10* (2006.01)
(52) U.S. Cl. ................... 219/117.1; 219/86.7
(58) Field of Classification Search ............. 219/117.1, 219/86.7
See application file for complete search history.

(56) References Cited

U.S. PATENT DOCUMENTS 3,541,668 A * 11/1970 Schuld et al. ................. 29/469

FOREIGN PATENT DOCUMENTS

JP          8-40325      *  2/1996
JP         11-348854     * 12/1999

* cited by examiner

*Primary Examiner*—Len Tran
(74) *Attorney, Agent, or Firm*—Morgan Lewis & Bockius LLP

(57) ABSTRACT

The method for assembling a vehicle body according to an embodiment of the present invention includes: a floor assembly key-welding process for affixing a center floor and a rear floor together through a tack welding; a floor assembly respot process for forming a floor assembly by completely affixing a plurality of parts of the center floor and the rear floor together by spot welding; a vehicle body build-up key-welding process for forming an overall vehicle body frame by temporarily assembling a left side panel, a right side panel, a cowl, and a roof to the floor assembly; a vehicle body respot process for forming a vehicle body by completely affixing a plurality of parts of the left side panel, the right side panel, the cowl, and the roof by spot welding; and a front end assembling process for forming a final vehicle body by assembling a front end to the vehicle body by spot welding.

4 Claims, 3 Drawing Sheets

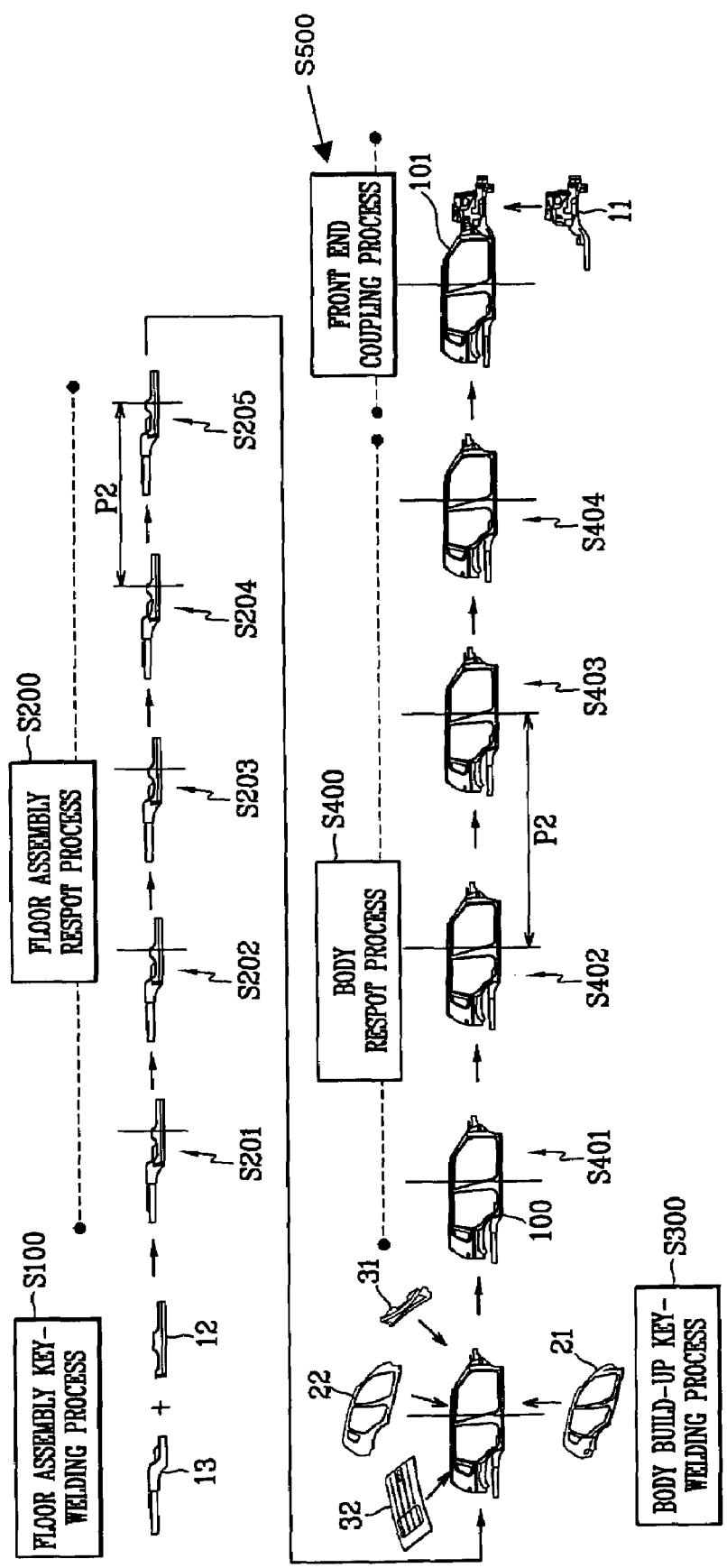

METHOD FOR ASSEMBLING A VEHICLE BODY

CROSS REFERENCE TO RELATED APPLICATION

This application claims priority to Korean Application No. 10-2004-0042287, filed on Jun. 9, 2004, the disclosure of which is incorporated herein by reference.

FIELD OF THE INVENTION

Generally, the present invention relates to a method for assembling a vehicle body. More particularly, the present invention relates to a method for assembling a vehicle body in which a front end that is composed of a floor assembly of a vehicle body is assembled after a vehicle body build-up process, thereby making a vehicle body assembly line more compact and decreasing the required workplace area for a vehicle body assembly.

BACKGROUND OF THE INVENTION

In a vehicle manufacturing line, a vehicle is formed by assembling twenty to thirty thousand parts in various assembly lines and welding processes. In particular, a vehicle body frame in a monocoque construction generally consists of three parts, as shown in FIG. 1, namely: a floor assembly 10 that is composed of a front end 11, a center floor 12, and a rear floor 13, and supports a driving part, such as an engine, a vehicle shaft, and seats; a side assembly that is composed of left and right side panels 21 and 22, and supports left and right sides of a vehicle body frame; and a cowl and roof assembly that is composed of a cowl 31 and a roof 32, and supports an upper portion of a vehicle body frame.

Although ways for assembling such a vehicle body structure are slightly different among vehicle manufacturing companies, they are substantially similar. That is, in a conventional method for assembling a vehicle body, as shown in FIG. 2, the front end 11, the center floor 12, and a rear floor 13 are fixed to each other by tack welding in a floor assembly key-welding process S10, and a plurality of parts of the front end 11, the center floor 12, and the rear floor 13 are completely fixed to each other by spot welding in a floor assembly respot process S20 that is composed of five steps.

The five steps of the floor assembly respot process S20 are as follows. At step S21, connecting member parts of the front end 11, the center floor 12, and the rear floor 13 are additionally welded along a vertical direction. At step S22, connecting side parts of the front end 11, the center floor 12, and the rear floor 13 are welded. Then, at step S23, connecting panel parts of the front end 11, the center floor 12, and the rear floor 13 are welded. At step S24, a center tunnel slanting part of a connecting part of the front end 11, the center floor 12, and the rear floor 13 are welded. Lastly, at step S25, the front end 11, the center floor 12, and the rear floor 13 are finally welded and a special welding is performed.

After the floor assembly 10 is formed in the floor assembly respot process S20, an overall vehicle body frame is formed by temporarily assembling left and right side panels 21 and 22, the cowl 31, and the roof 32 in a vehicle body build-up key-welding process S30. Then, in the vehicle body respot process S40, a plurality of parts of the left and right side panels 21 and 22, the cowl 31, and the roof 32 that are temporarily assembled are completely fixed by spot welding.

The steps of the vehicle body respot process S20 are as follows. At step S41, side flange portions for mounting the floor assembly 10 and the left and right side panels 21 and 22 together are welded, and at step S42, mounting portions between the left and right side panels 21 and 22 and the roof 32 are welded along a vertical direction. At step S43, mounting portions between the floor assembly 10 and the left and right side panels 21 and 22 that are positioned inside a vehicle body, and at step S44, rear wheel portions of the left and right side panels 21 and 22 and the floor assembly 10, are specially welded. Finally, at step S45, the floor assembly 10 and rear lamp portions of the left and right side panels 21 and 22 are welded together, and the cowl 31 and a dash portion of the front end 11 are welded together.

In the conventional method of assembling a vehicle body, the front end 11 is assembled to the center floor 12 and the rear floor 13 to form the floor assembly 10 in the floor assembly key-welding process S10 and the floor assembly respot process S20, and then the floor assembly 10 including the front end 11 flows through the remaining processes. Accordingly, a pitch P1 of each process becomes long to accommodate practically the length of the vehicle, so that required workspace also increases. That is, assembling the front end 11 to the center floor 12 in an early stage of the vehicle body assembling is required only for welding matching portions of the left and right side panels 21 and 22 and the cowl 31 thereto, but in other processes the pre-assembled front end 11 only increases the pitch between processes.

In addition, recently, there is a tendency of making related parts as a module, and a radiator support panel that is assembled to the front end is generally supplied as a module by assembling various parts such as a front bumper, a headlamp, and a radiator cooling system. Because the radiator support panel module is assembled in a trim line, the structural strength of a front portion of the front end 11 is not sufficient. Particularly, after the front end is assembled, the vehicle body may undergo much shuttling between stations along an assembly line, so that significant deformations of the vehicle body may occur. Such deformations result in a deterioration of a quality of the vehicle body.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides a method for assembling a vehicle body while decreasing the required workspace for assembling the vehicle body by assembling a front end after a vehicle body build-up process. In addition, the present invention provides a method for assembling a vehicle body that minimizes damage to the front portion of the front end that may have little structural strength due to repeated shuttling along an assembly line.

An exemplary method for assembling a vehicle body according to an embodiment of the present invention includes: a floor assembly key-welding process for fixing a center floor and a rear floor together by tack welding; a floor assembly respot process for forming a floor assembly by completely fixing a plurality of parts of the center floor and the rear floor together by spot welding; a vehicle body build-up key-welding process for forming an overall vehicle body frame by temporarily assembling a left side panel, a right side panel, a cowl, and a roof to the floor assembly; a vehicle body respot process for forming a vehicle body by completely fixing a plurality of parts of the left side panel, the right side panel, the cowl, and the roof by spot welding; and a front end assembling process for forming a final vehicle body by assembling a front end to the vehicle body by spot welding.

BRIEF DESCRIPTION OF THE DRAWINGS

The accompanying drawings illustrate exemplary embodiments of the present invention, and, together with the description, serve to explain the principles of the present invention, wherein:

FIG. 3 shows a method for assembling a vehicle body according to an embodiment of the present invention.

DETAILED DESCRIPTION OF THE EMBODIMENTS

Figure 1:
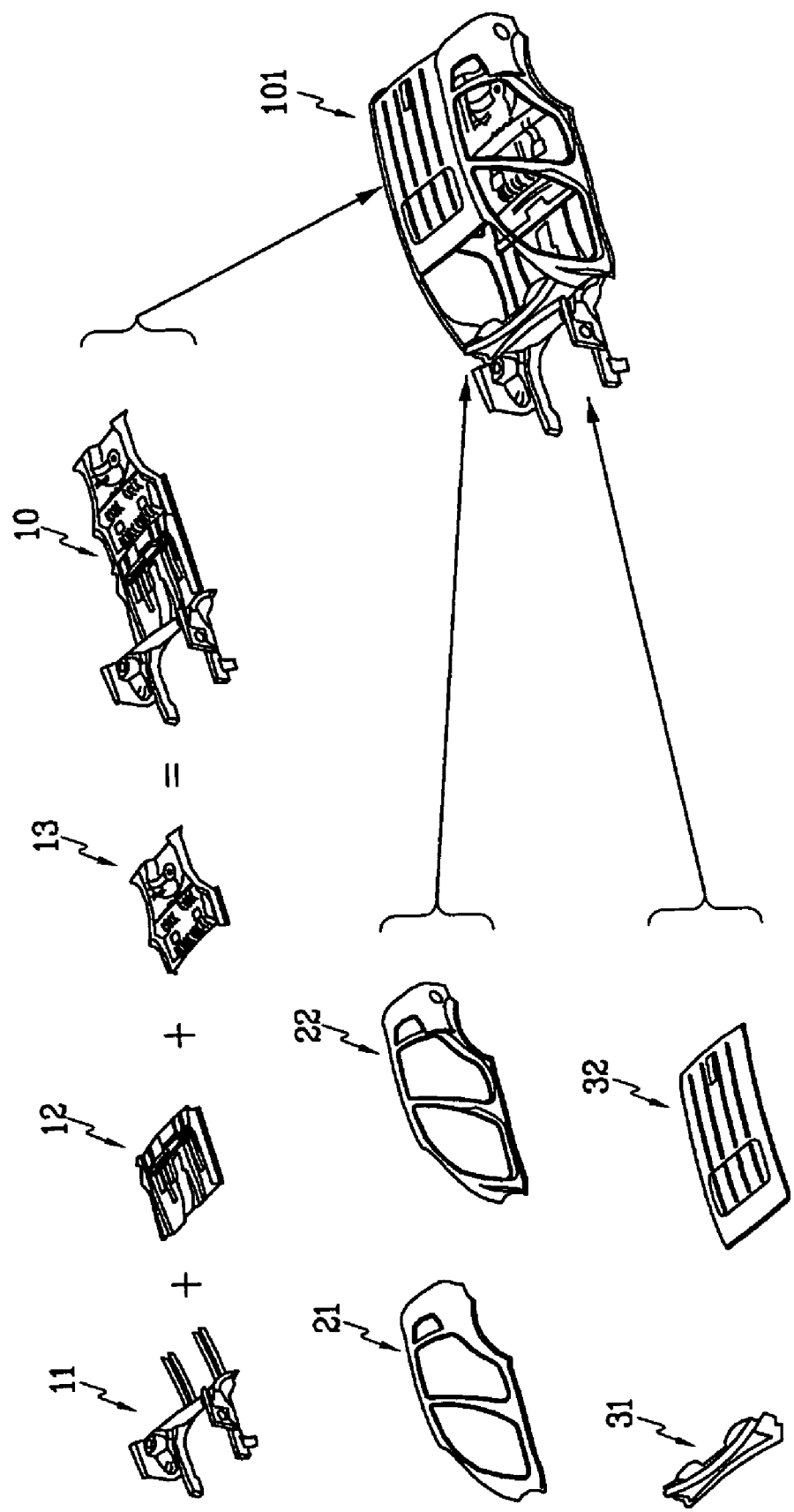
FIG. 1 shows a vehicle body structure in a monocoque construction.
Figure 2:
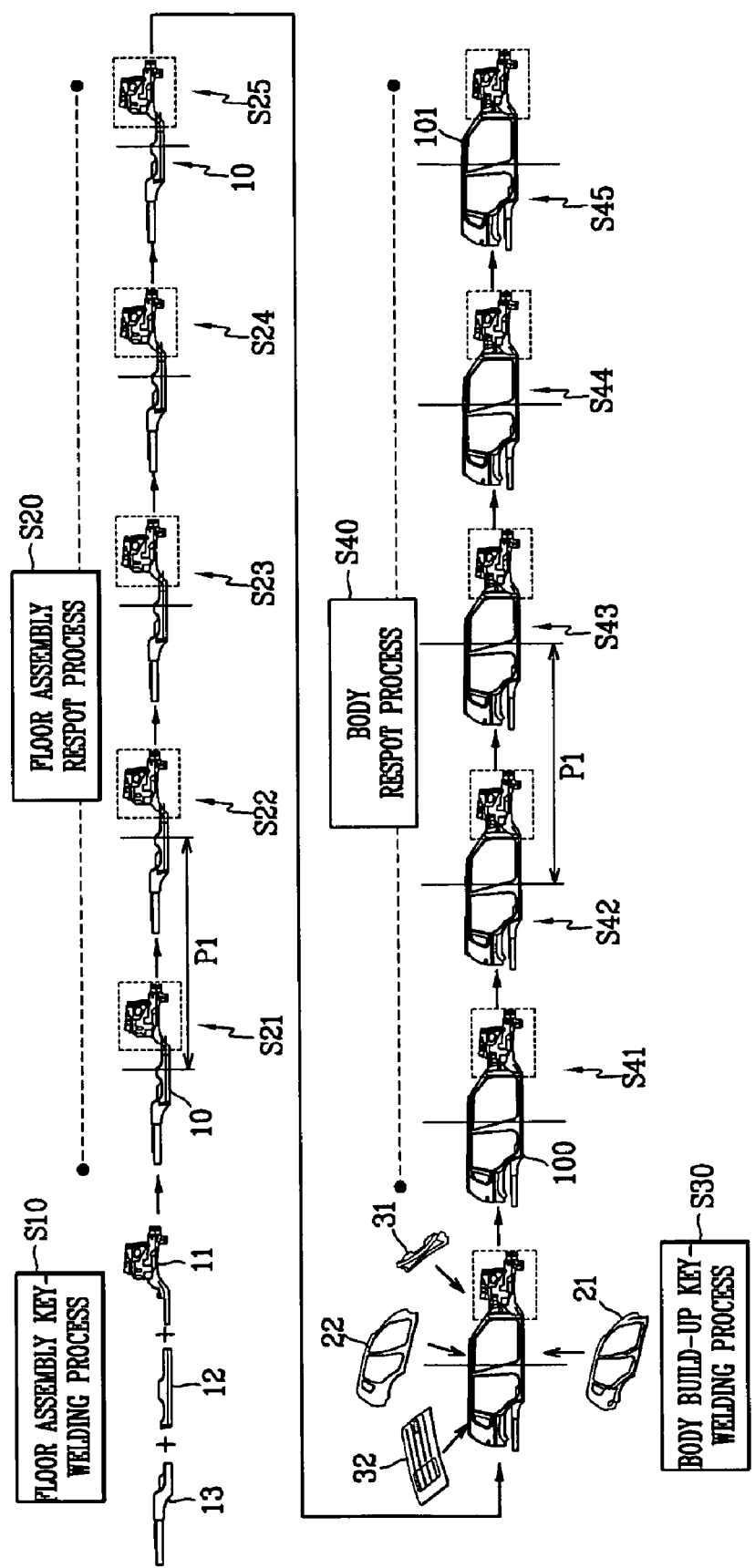
FIG. 2 shows a conventional method for assembling a vehicle body.

An embodiment of the present invention will hereinafter be described in detail with reference to the accompanying drawings. Reference numerals shown in FIG. 1 are used hereinafter.

A method for assembling a vehicle body according to an embodiment of the present invention, as shown in FIG. 3, comprises a floor assembly key-welding process S100, a floor assembly respot process S200, a body build-up key-welding process S300, and a body respot process S400.

In the floor assembly key-welding process S100, a center floor 12 and a rear floor 13, except a front end 11, are fixed together by tack welding. Contrary to the conventional method, the front end 11 is not assembled in the floor assembly key-welding process.

Then, in the floor assembly respot process S200, the center floor 12 and the rear floor 13 are completely fixed together by spot welding on a plurality of parts of the center floor 12 and the rear floor 13, thereby forming a floor assembly that does not include the front end 11. The floor assembly respot process may be composed of five steps. For example, the floor assembly respot process S200 may include the following five steps. In first step S201, connecting parts of the center floor 12 and the rear floor 13 are welded along a vertical direction, and in a second step S202, connecting side parts of the center floor 12 and the rear floor 13 are additionally welded. Further, in a third step S203, connecting panel parts of the center floor 12 and the rear floor 13 are welded along a vertical direction, and in a fourth step S204, a center tunnel slanting part of connecting parts of the center floor 12 and the rear floor 13 are welded. Lastly, in a fifth step S205, the center floor 12 and the rear floor 13 are finally welded and a special welding is performed.

After forming the floor assembly 10 through the floor assembly respot process S200, an overall vehicle body frame is formed by temporarily assembling a left side panel 21, a right side panel 22, a cowl 31, and a roof 32 to the floor assembly 10, in the vehicle body build-up key-welding process S300.

Then, in the vehicle body respot process S400, the left and right side panels 21 and 22, the cowl 31, and the roof 32 are completely fixed together by spot welding on a plurality of parts of the left and right side panels 21 and 22, the cowl 31, and the roof 32, thereby forming a vehicle body 100 that does not include the front end 11. The vehicle body respot process may be composed of four steps. For example, the vehicle body respot process S400 may include the following four steps. In a first step S401, side flange portions for mounting the floor assembly, without the front end 11, and the left and right side panels 21 and 22 together are welded, and in a second step S402, mounting portions between the left and right side panels 21 and 22 and the roof 32 are welded along a vertical direction. In addition, in a third step S403, mounting portions between the floor assembly and the left and right side panels 21 and 22 that are positioned inside a space defined by a vehicle body, and in a fourth step S404, the floor assembly and rear lamp portions of the left and right side panels 21 and 22 are welded together.

Then, in the front end coupling process S500, the front end 11 is assembled to a front portion of the vehicle body 100 through spot welding, thereby forming a final vehicle body 101 including the front end 11.

According to an embodiment of the present invention, a pitch P2 between processes can be decreased by a length of the front end in all processes except the front end coupling process S500, so that workspace for assembling a vehicle body can be substantially decreased. In addition, because the front end 11 is assembled in a final process S500, damage, due to repeated shuttling of the body up and down the assembly line, to a front portion of the front end 11 having little structural strength can be minimized. Furthermore, a jig unit for fixing the front end need not be equipped in all processes, rather the jig unit is needed only for the process S500. Therefore, equipment for the method for assembling a vehicle body is simplified and the cost reduced.

While this invention has been described in connection with what is presently considered to be the most practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An assembly line for assembling a vehicle body, comprising:

a floor assembly key-welding process for fixing a center floor and a rear floor together by tack welding;

a floor assembly respot process for forming a floor assembly by completely affixing a plurality of parts of the center floor and the rear floor together by spot welding;

a vehicle body build-up key-welding process for forming an overall vehicle body frame by temporarily assembling a left side panel, a right side panel, a cowl, and a roof to the floor assembly;

a vehicle body respot process for forming a vehicle body by completely fixing a plurality of parts of the left side panel, the right side panel, the cowl, and the roof by spot welding; and a front end assembling process for forming a final vehicle body by assembling a front end to the vehicle body by spot welding;

wherein said front end assembling process is performed after said floor assembly key-welding process, said floor assembly respot process, said vehicle body build-up key-welding process, and said vehicle body respot process.

2. The assembly line in claim 1, wherein jig unit is only required during the front end assembling process.

3. A method for assembling a vehicle body, comprising:

fixing a center floor and a rear floor together by tack welding;

forming a floor assembly by completely affixing a plurality of parts of the center floor and the rear floor together by spot welding;

forming an overall vehicle body frame by temporarily assembling a left side panel, a right side panel, a cowl, and a roof to the floor assembly;

completely affixing a plurality of parts of the left side panel, the right side panel, the cowl, and the roof by spot welding; and forming a final vehicle body by assembling a front end to the vehicle body by spot welding;

wherein said assembling a front end is performed after said fixing a center floor and a rear floor, said forming a floor assembly, said forming an overall vehicle body frame, and said affixing a plurality of parts of the left side panel, the right side panel, the cowl, and the roof.

4. The method in claim 3, wherein aug unit is only required during said forming a final vehicle body.

* * * * *